(12) United States Patent
Nagano (10) Patent No.: US 9,983,568 B2
(45) Date of Patent: May 29, 2018

(54) NUMERICAL CONTROLLER

(71) Applicant: FANUC Corporation, Minamitsuru-gun, Yamanashi (JP)

(72) Inventor: Katsunori Nagano, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 231 days.

(21) Appl. No.: 14/960,805

(22) Filed: Dec. 7, 2015

(65) Prior Publication Data

US 2016/0195870 A1  Jul. 7, 2016

(30) Foreign Application Priority Data

Dec. 12, 2014  (JP) ................................ 2014-252230

(51) Int. Cl.
*G05B 19/4061* (2006.01)

(52) U.S. Cl.
CPC .............. *G05B 19/4061* (2013.01); *G05B 2219/37237* (2013.01); *G05B 2219/40339* (2013.01)

(58) Field of Classification Search
CPC ...... G05B 19/4061; G05B 2219/37237; G05B 2219/40339
See application file for complete search history.

(56) References Cited

U.S. PATENT DOCUMENTS 4,590,572 A * 5/1986 Imanishi .............. G05B 19/408
                                                         700/169
4,878,172 A * 10/1989 Matsumura ...... G05B 19/40937
                                                         700/181
5,496,984 A * 3/1996 Goto ...................... B23H 1/024
                                                         219/69.13

(Continued)

FOREIGN PATENT DOCUMENTS

JP   S59-216205 A   12/1984
JP   H01-135491 A   5/1989

(Continued)

OTHER PUBLICATIONS

Notification of Reasons for Refusal dated Oct. 18, 2016 in Japanese Patent Application No. 2014-252230 (3 pages) with an English Translation (4 pages).

*Primary Examiner* — Ramesh Patel (74) *Attorney, Agent, or Firm* — Drinker Biddle & Reath LLP (57) ABSTRACT

In a numerical controller that controls a plurality of machine control axes based on a machining program, priorities are assigned to operations of the plurality of machine control axes, and the numerical controller includes: a command analyzing portion that analyzes the machining program and generates command data which controls the plurality of machine control axes; and a block execution start determining portion that determines whether interference occurs in the operations of the plurality of machine control axes based on the command data and, if a determination is made that (Continued)

interference occurs, adjusts timing with which a command which controls an operation of a machine control axis of lower priority of the plurality of machine control axes that interfere with each other is started to a time at which the interference does not occur and positioning is completed in the shortest time.

12 Claims, 8 Drawing Sheets

(56) References Cited

U.S. PATENT DOCUMENTS

| | | | | |
|---|---|---|---|---|
| 7,024,271 | B2* | 4/2006 | Ogino | G05B 19/406 |
| | | | | 700/177 |
| 8,145,347 | B2* | 3/2012 | Nakamura | G05B 19/4103 |
| | | | | 318/560 |
| 8,374,718 | B2* | 2/2013 | Takahashi | G05B 19/4069 |
| | | | | 318/568.15 |
| 2009/0248203 | A1* | 10/2009 | Nakamura | G05B 19/4103 |
| | | | | 700/251 |
| 2011/0035044 | A1* | 2/2011 | Takahashi | G05B 19/4069 |
| | | | | 700/178 |

FOREIGN PATENT DOCUMENTS

| | | |
|---|---|---|
| JP | H08-166809 A | 6/1996 |
| JP | H08-263115 A | 10/1996 |
| JP | 2006-075916 A | 3/2006 |
| JP | 2006-154980 A | 6/2006 |

\* cited by examiner

FIG. 4A (PRESENT INVENTION: ONE BLOCK)

O0002;
N20 G00 P1 L0.0 P2 A0.0;
N30 G01 X100.0 Y100.0 F500.0;

FIG. 4B (PRESENT INVENTION: DIFFERENT BLOCKS)

$$TAout = \frac{\text{DISTANCE BY WHICH OBJECT TO BE CONTROLLED OF HIGHER PRIORITY MOVES BEFORE EXITING INTERFERENCE REGION}}{\text{MOVEMENT SPEED OF OBJECT TO BE CONTROLLED OF HIGHER PRIORITY}}$$

$$TBin = \frac{\text{DISTANCE BY WHICH OBJECT TO BE CONTROLLED OF LOWER PRIORITY MOVES BEFORE ENTERING INTERFERENCE REGION}}{\text{MOVEMENT SPEED OF OBJECT TO BE CONTROLLED OF LOWER PRIORITY}}$$

FIG. 6A

DOOR STARTS TO OPERATE WITH TIMING WITH WHICH DOOR DOES NOT INTERFERE WITH LOADER EVEN WHEN DOOR STARTS TO OPERATE

FIG. 6B

INTERFERENCE DOES NOT OCCUR BECAUSE DOOR ENTERS INTERFERENCE REGION THE MOMENT WHEN LOADER EXITS INTERFERENCE REGION

FIG. 6C

EVEN WHEN LOADER IS MOVING, MACHINING IS STARTED WHEN DOOR IS CLOSED

IF COMMANDS ARE
DESCRIBED IN ONE BLOCK
N100 G00 L0.0 A0.0;

IF COMMANDS ARE DESCRIBED
IN DIFFERENT BLOCKS
N100 G00 L0.0;
N200 G00 A0.0;

INTERFERENCE OCCURS IF
RETRACTING OPERATION OF
LOADER AND CLOSING
OPERATION OF DOOR ARE
STARTED AT THE SAME TIME

IT TAKES TIME IF
DOOR IS CLOSED
AFTER LOADER AXIS
COMPLETELY
RETRACTS

FIG. 9A

```
O0001;
N10 G00 L0.0 ; RETRACT LOADER AXIS
N20 G00 A0.0 ; CLOSE DOOR
N30 G01 X100.0 Y100.0 F500.0;
```

NUMERICAL CONTROLLER

RELATED APPLICATION DATA

This application claims priority under 35 U.S.C. § 119 and/or § 365 to Japanese Application No. 2014-252230 filed Dec. 12, 2014, the entire contents is incorporated herein by reference.

BACKGROUND OF THE INVENTION

1. Field of the Invention

The present invention relates to numerical controllers and, in particular, to a numerical controller having the function of avoiding interference by assigning priorities to control point commands when performing positioning of a plurality of control points and adjusting movement start timing of a command of lower priority.

2. Description of the Related Art

In the past, if there is a possibility of interference, positioning commands for a plurality of control points have been described in different blocks, not one block, and then executed (Japanese Patent Application Laid-Open No. 2006-075916, for example).

Figure 8A:
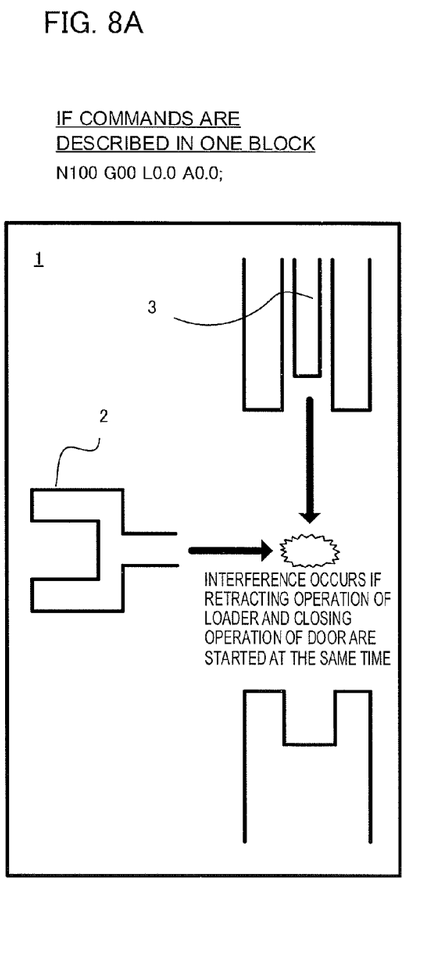
FIGS. 8A and 8B are diagrams explaining a problem of control of a loader and a door which are controlled by a numerical controller of the prior art technique.
Figure 8B:
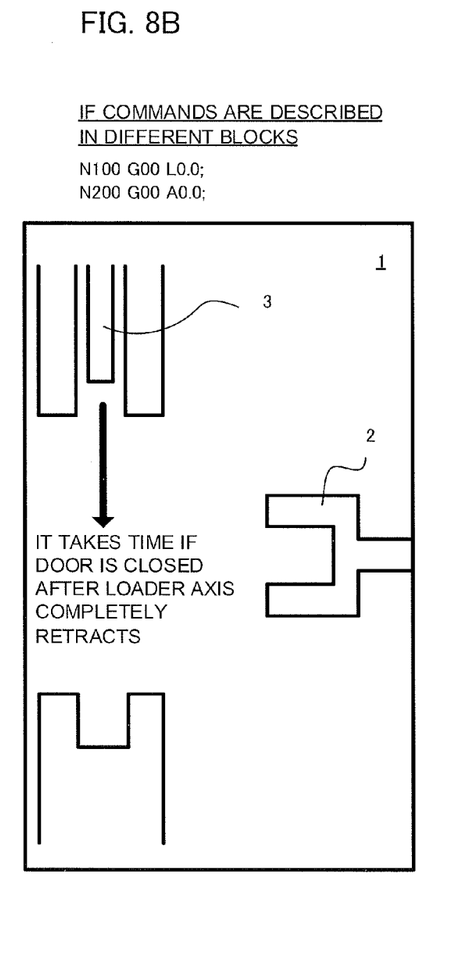

For example, as depicted in FIGS. 8A and 8B, when a loader 2 and a door 3 are controlled by an L axis and an A axis, respectively, in a machine tool 1, commands for the L axis and the A axis are described in different blocks since interference occurs if commands for a retracting operation of the loader 2 and a closing operation of the door 3 are described in one block.

As in the prior art technique, in the method in which control point commands are described in different blocks, objects to be controlled do not interfere with each other because a control operation of a next block is not started until a control operation by a previous block is finished. However, since the next block cannot be started until the operation of the block in which an earlier command is described is completed, the time after the operation of the earlier command proceeds and the state enters a state in which no interference occurs becomes useless waiting time.

The useless waiting time in the prior art technique will be described in detail by using FIGS. 9A to 9E.

FIGS. 9A to 9E are diagrams depicting the flow of operation control by which work is placed by a loader, the loader is retracted, and then a machining operation is started after a door is closed. In the machine tool 1 depicted in the drawings, it is assumed that positioning control of the loader 2 is performed by the L axis and opening and closing control of the door 3 is performed by the A axis and the loader 2 and the door 3 are controlled in accordance with a machining program depicted in FIG. 9A.

Figure 9A:
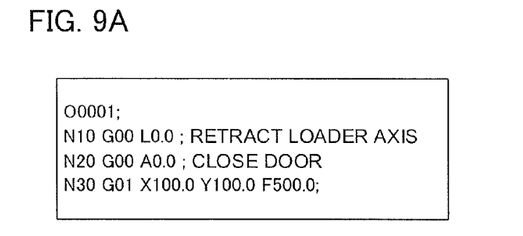
FIGS. 9A, 9B, 9C, 9D, and 9E are diagrams depicting an operation example of the loader and the door which are controlled by the numerical controller of the prior art technique.
Figure 9B:
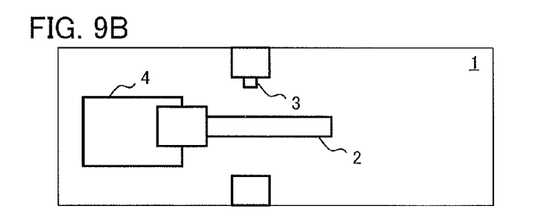
Figure 9C:
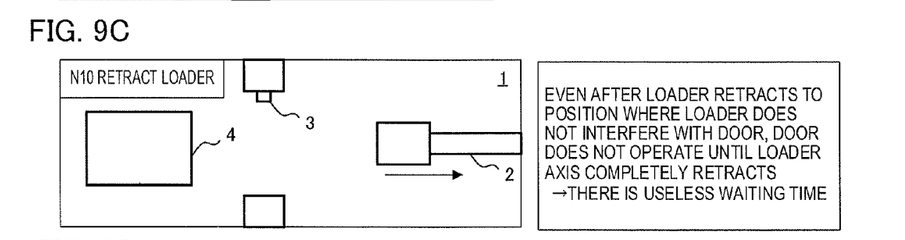
Figure 9D:
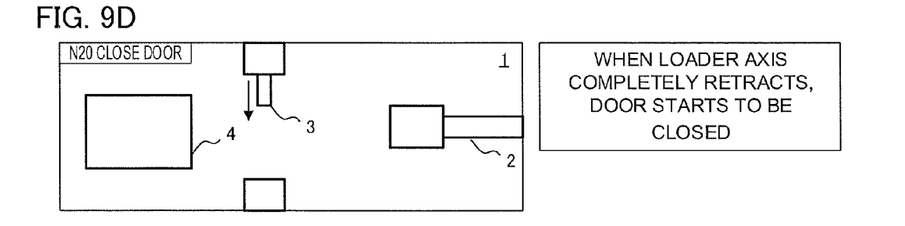
Figure 9E:
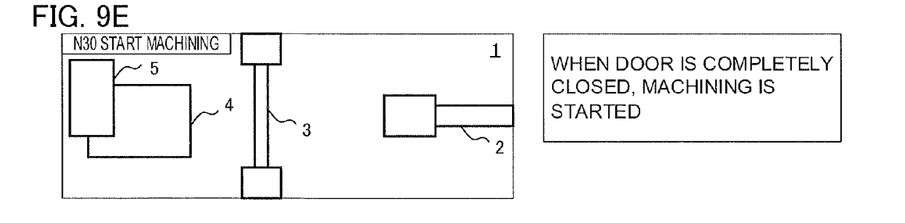

When the loader 2 and the door 3 are controlled in accordance with the machining program of FIG. 9A, as depicted in FIGS. 9B to 9E, the door 3 starts to be closed when the loader 2 retracts after finishing placement of the work 4 and machining of the work 4 is started by a tool 5 when the door 3 is completely closed. In the prior art technique, the loader 2 retracts in an N10 block of a program O0001, but execution of an N20 block is not started until the loader 2 completely retracts. If the loader 2 operates slowly, there will be useless waiting time before the start of the closing operation of the door 3.

As an existing function similar to the present invention, there is a "waiting function by specifying start point". However, this function is a function that allows one path in a multi-path system to coordinate with the other path and cannot be used for coordination in one path. Moreover, coordinate values based on which coordination is performed have to be specified in a machining program, but it is not easy to obtain accurately, based on the movement distance and the movement speed, coordinate values by which interference can be avoided.

SUMMARY OF THE INVENTION

An object of the present invention is accordingly to provide a numerical controller that can avoid interference and perform positioning in the shortest time by assigning priorities to control point commands and adjusting movement start timing of a command of lower priority in a case where, in positioning of a plurality of control points which is performed by using a machining program, interference occurs if positioning is started at the same time but it takes time before positioning is completed if commands therefor are described in different blocks.

A numerical controller according to the present invention is directed to a numerical controller that controls a plurality of machine control axes based on a machining program, in which priorities are assigned to operations of the plurality of machine control axes. The numerical controller includes: a command analyzing portion that analyzes the machining program and generates command data which controls the plurality of machine control axes; and a block execution start determining portion that determines whether interference occurs in the operations of the plurality of machine control axes based on the command data and, if a determination is made that interference occurs, adjusts timing with which a command which controls an operation of a machine control axis of lower priority of the plurality of machine control axes that interfere with each other is started to a time at which the interference does not occur and positioning is completed in the shortest time.

The block execution start determining portion may obtain an interference region which is a region in which interference of the plurality of machine control axes that interfere with each other occurs based on movement paths of the plurality of machine control axes that interfere with each other and adjust timing with which the command which controls the operation of the machine control axis of lower priority of the plurality of machine control axes that interfere with each other is started based on timing with which a machine control axis of higher priority exits the interference region, the machine control axis of the plurality of machine control axes that interfere with each other, and timing with which the machine control axis of lower priority enters the interference region, the machine control axis of the plurality of machine control axes that interfere with each other.

In adjustment of the timing, calculation may be performed with respect to the operation times of the plurality of machine control axes.

In adjustment of the timing, calculation may be performed with respect to the coordinate values of the plurality of machine control axes.

The numerical controller may further include a unit that designates, by an input signal from the outside of the numerical controller, timing with which a command controlling the operation of the machine control axis of lower priority is started.

With the above configuration, the present invention can perform positioning in the shortest time without interference even when positioning commands of a plurality of control points that interfere with each other are described in one block or different blocks and therefore shorten a cycle time.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS

First, a fundamental technical outline of the present invention will be described. In the present invention, priorities are assigned to commands for control points and a numerical controller automatically adjusts movement start timing of a command of lower priority, whereby it is possible to avoid interference and perform positioning in the shortest time.

Figure 1:
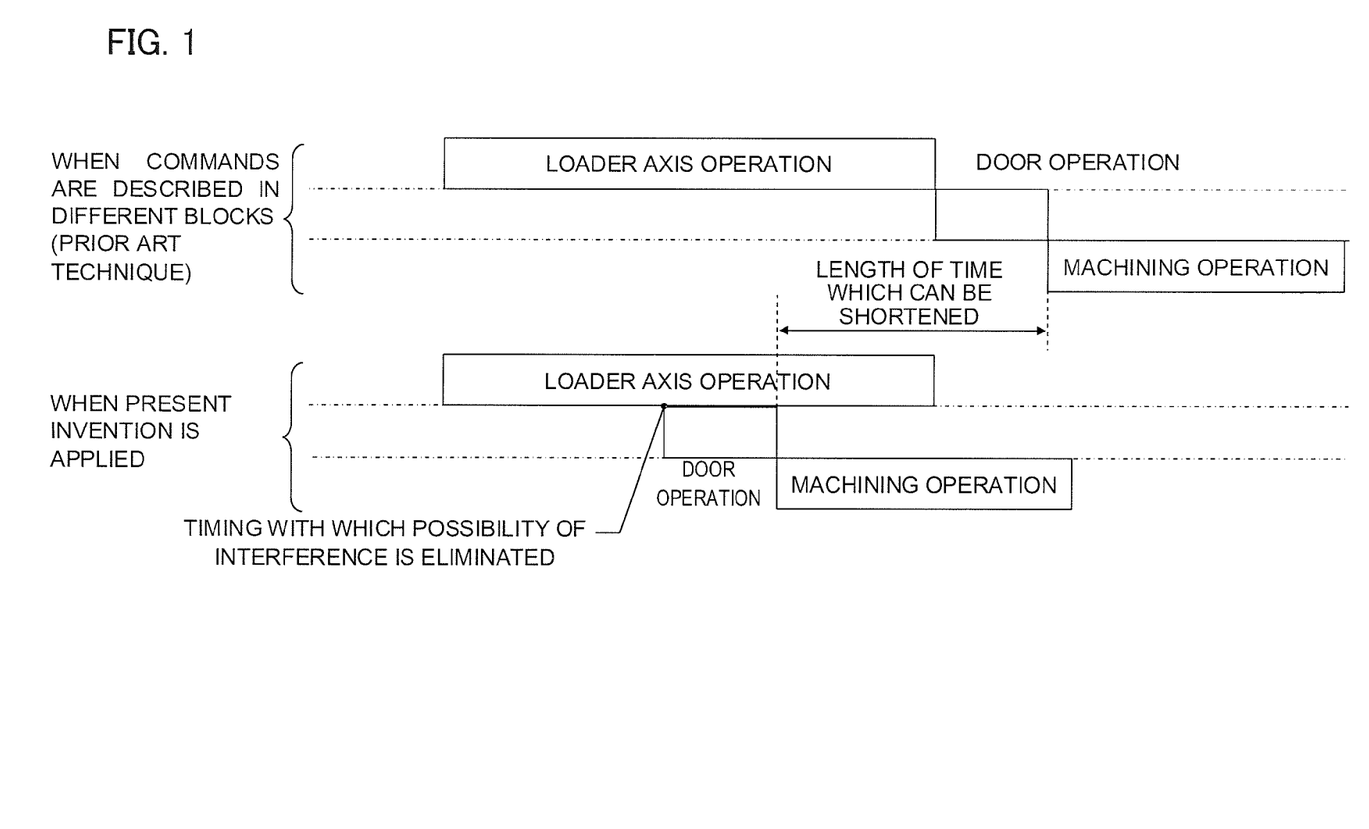
FIG. 1 is a timing diagram indicating a difference in loader, door, and machining operation start timing between the prior art technique and the present invention.

In the present invention, as a method for adjusting operation start timing, a method by which a command of higher priority and a command of lower priority are described in one block and movement start timing is adjusted in the block and a method by which a command of higher priority and a command of lower priority are described as different blocks and block start timing of the command of lower priority is adjusted are proposed. In both cases, as depicted in FIG. 1, an operation is started with timing with which the possibility of interference of the control points is eliminated. By performing control in this manner, it is possible to eliminate useless time and shorten the entire operation time as compared to the prior art technique.

Figure 2:
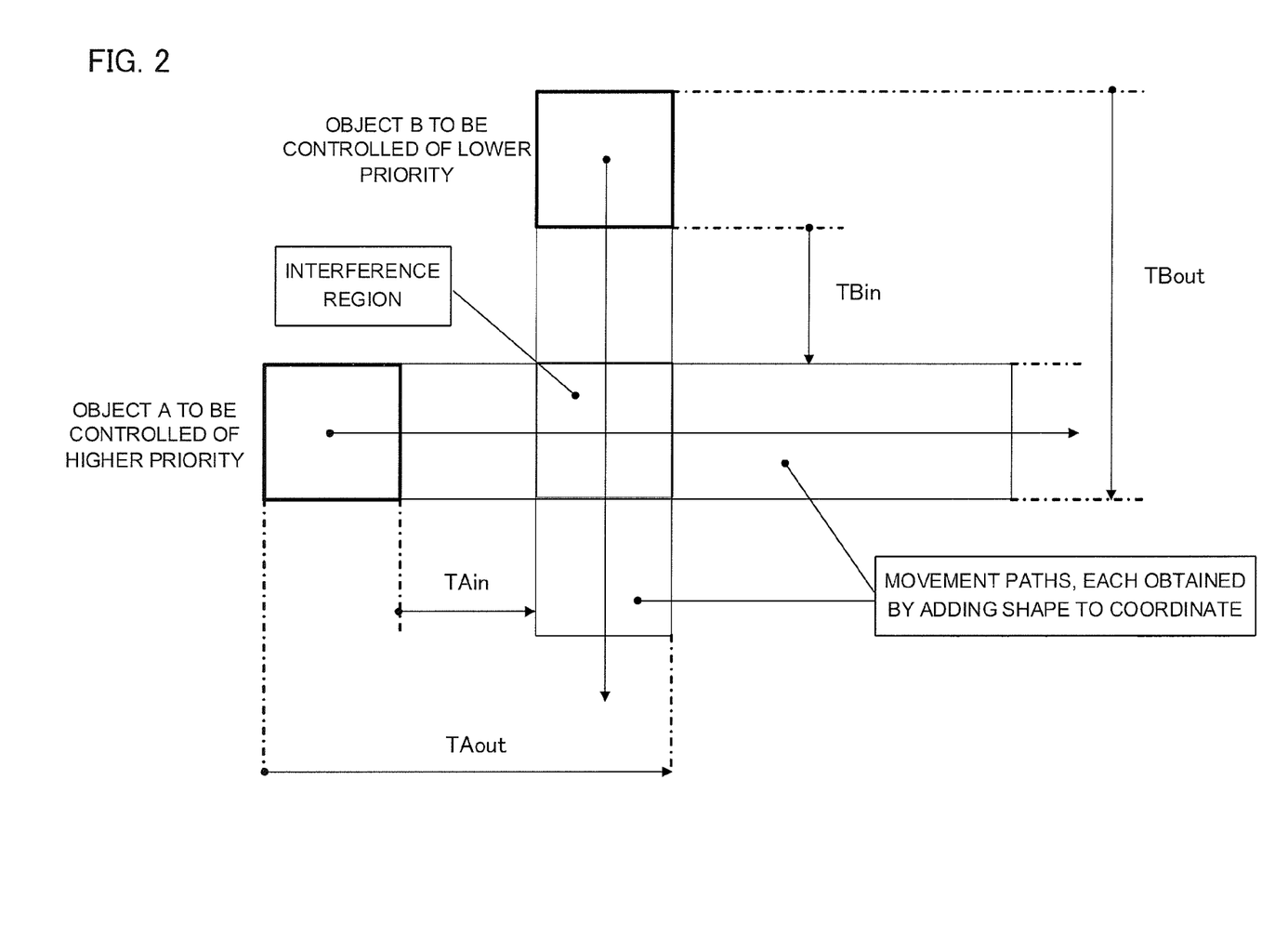
FIG. 2 is a diagram explaining a movement path of an object to be controlled and an interference region in the present invention.

The determination of interference in the present invention is performed as follows. With block execution start timing, based on a premise that each control point moves linearly, a line segment indicating a starting point to an end point of the control point is imaginarily drawn and a determination is made as to whether or not there is a point of intersection of the line segments in three planes: an XY plane, a YZ plane, and a ZX plane. If there is a point of intersection in each plane and the coordinates of the points of intersection in the planes coincide with each other, there is a possibility that interference occurs depending on movement timing. In actuality, since an object to be controlled has a shape, a shape corresponding to each control point is specified in advance by a parameter or the like, a movement path obtained by adding the shape to the coordinate values of the control point is obtained as depicted in FIG. 2, and the determination of the presence or absence of interference is made based on an interference region in which the movement paths overlap one another.

Incidentally, when the shape is added to the coordinate values of the control point, the accurate shape of the object to be controlled obtained by setting the coordinate values of the control point as a reference position may be stored in advance and a region through which the object to be controlled passes at the time of movement may be determined as a movement path. Alternatively, if the shape of the object to be controlled is expressed as a simple polygonal shape (for example, a simple rectangular parallelepiped which is parallel to an X axis, a Y axis, and a Z axis) including the shape of the object to be controlled, only by obtaining a movement path of each end point of the polygonal shape, it is possible to obtain easily a movement path obtained by adding the shape of the object to be controlled to the coordinate values of the control point and an interference region in which the movement paths overlap one another.

Next, if there is a possibility of interference, the time ($T_{Ain}$, $T_{Bin}$) that elapses before each object to be controlled enters the interference region and the time ($T_{Aout}$, $T_{Bout}$) that elapses before each object to be controlled exits the interference region are calculated based on the movement speed of the object to be controlled and the distance from the object to be controlled to the interference region. If the above time of one object to be controlled coincides with the time of the other object to be controlled, the two objects to be controlled enter the interference region at the same time and therefore interference occurs. By making the determination in three planes in a similar manner, the final determination of the presence or absence of interference is made.

Then, if the determination is made that interference occurs, operation start timing of an object to be controlled of lower priority is adjusted such that the object to be controlled of lower priority does not enter the interference region before an object to be controlled of higher priority exits the interference region. The time to be adjusted is a difference between the time ($T_{Aout}$) that elapses before the object to be controlled of higher priority exits the interference region and the time ($T_{Bin}$) that elapses before the object to be controlled of lower priority enters the interference region, these times corresponding to the times that coincide with each other in FIG. 2, for example. As a result of this adjustment, timing with which the object to be controlled of higher priority exits the interference region and timing with which the object to be controlled of lower priority enters the interference region coincide with each other and interference is avoided.

Incidentally, as a timing adjustment method, in addition to the above-described adjustment which is performed based on time, adjustment which is performed based on coordinate values is also possible. The coordinate values observed after a lapse of $T_{Aout} \cdot T_{Bin}$ after the object to be controlled of higher priority starts to operate can be calculated by the following Expression (1).

Coordinate values=starting point coordinate values+
movement speed×$[T_{Aout}-T_{Bin}]$     (1)

The object to be controlled of lower priority starts to operate when the coordinate values of the object to be controlled of higher priority exceed the above-described coordinate values (or fall below the above-described coordinate values depending on the direction of movement), whereby interference can be avoided. The adjustment which is performed based on the coordinate values makes it possible to make a precise determination even when the movement speed is changed due to a feed rate override or the like.

In both a case where the time is used as the reference and a case where the coordinate values are used as the reference, since the execution of a next block is started when the operation of a control point of lower priority is completed even when a control point of higher priority is still moving, performing positioning in the shortest time becomes possible.

Figure 3:
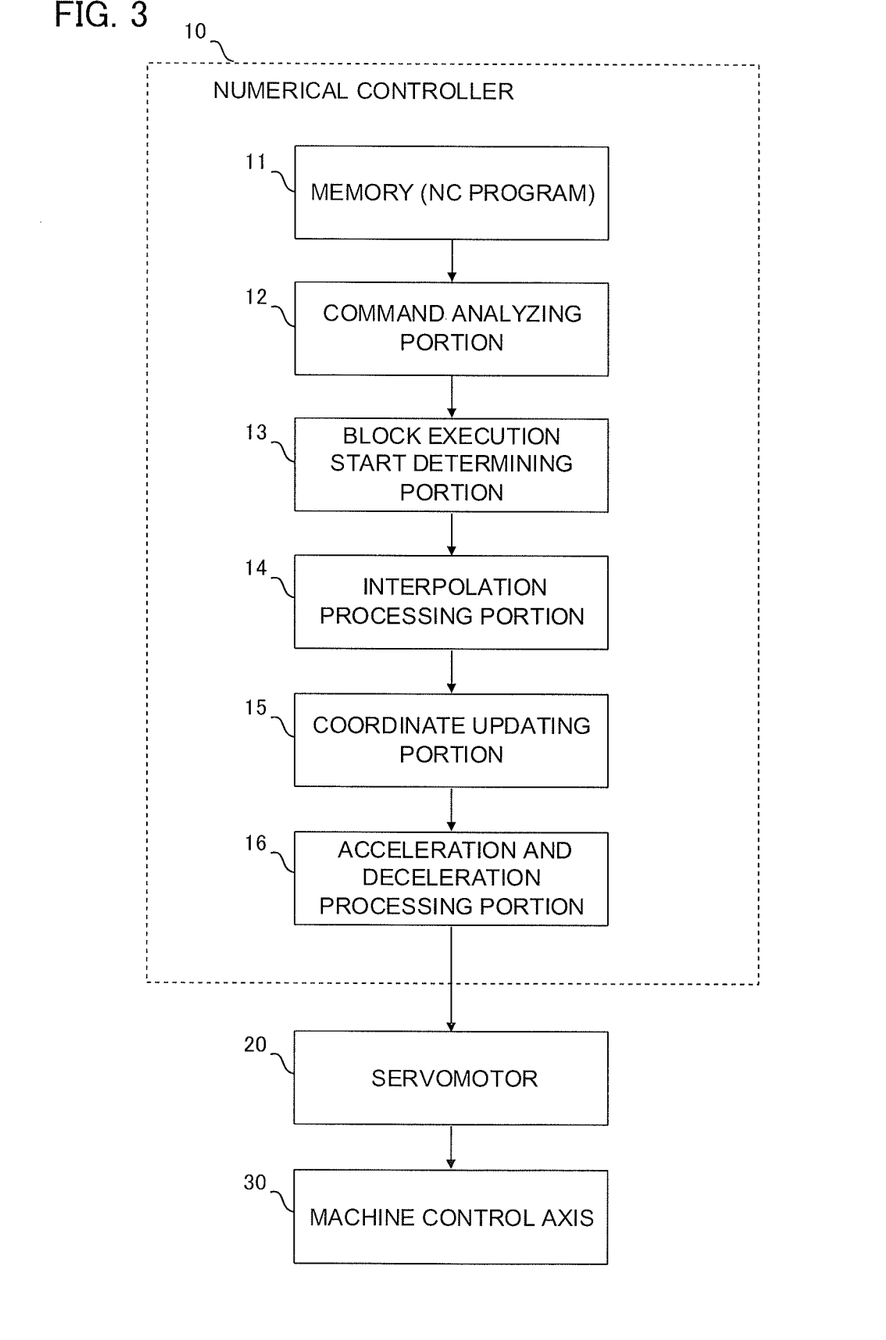
FIG. 3 is a functional block diagram of a numerical controller in an embodiment of the present invention.

Hereinafter, the technical configuration of the present invention will be described by using the drawing. FIG. 3 is a block diagram of principal portions of a numerical controller in an embodiment of the present invention.

A numerical controller 10 of this embodiment includes memory 11, a command analyzing portion 12, a block execution start determining portion 13, an interpolation processing portion 14, a coordinate updating portion 15, and an acceleration and deceleration processing portion 16.

The memory 11 is formed of RAM or the like and stores an NC program that controls a drive axis of a machine tool and machine control axes 30 of a loader, a door, and so forth.

The command analyzing portion 12 reads the NC program from the memory 11, analyzes the read NC program, and generates command data indicating movement commands for the drive axis of the machine tool and the machine control axes 30 of the loader, the door, and so forth.

The block execution start determining portion 13 which is the characteristic component element of the present invention calculates operation start timing of the machine control axes 30 based on a block that controls the machine control axes 30 of the loader, the door, and so forth by block execution start determination processing, which will be described later, and adjusts the command data output from the command analyzing portion 12 based on the calculated timing such that the machine control axes 30 do not interfere with each other.

The interpolation processing portion 14 executes interpolation processing based on the command data adjusted by the block execution start determining portion 13 and generates interpolation data. The coordinate updating portion 15 updates the coordinate values of the machine control axes 30 based on the interpolation data generated by the interpolation processing portion 14 and obtains the mechanical coordinate values of the machine control axes 30. Then, the acceleration and deceleration processing portion 16 performs acceleration and deceleration processing based on the mechanical coordinate values updated by the coordinate updating portion 15 and controls the driving of each machine control axis 30 via each servomotor 20.

Hereinafter, the block execution start determination processing which is performed by the block execution start determining portion 13 will be described.

Figure 4A:
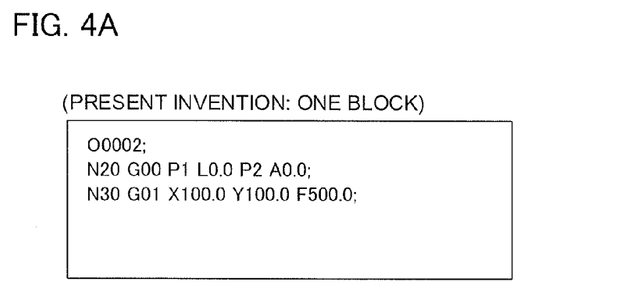
FIGS. 4A, and 4B is a diagram depicting an example of a machining program in the present invention.
Figure 4B:
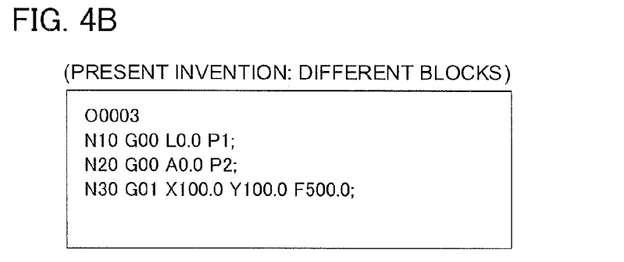

In FIG. 4, examples of descriptions of a program in this embodiment are depicted. In this embodiment, an address P is introduced to define the priority of an operation of the machine control axis 30 and a word "Pn" (n is an integer) is described in a command or a block, and it is assumed that the smaller the value of n is, the more preferentially the command or block is operated.

In FIG. 4A, a program O0002 indicates a case where the present invention is applied to one block, and a command written after P1 is a command of higher priority (a loader axis control command) and a command written after P2 is a command of lower priority (a door axis control command).

Moreover, in FIG. 4B a program O0003 indicates a case where the present invention is applied to different blocks, and an N10 block in which P1 is described is a block of higher priority and an N20 block in which P2 is described is a block of lower priority. In the numerical controller 10 of this embodiment, when the words Pn are described in different blocks, the command analyzing portion 12 generates command data by reading all the adjacent blocks in which the words Pn are described, the adjacent blocks in which the commands for controlling different axes are described, and the block execution start determining portion 13 performs the block execution start determination processing based on the command data.

In the block execution start determination processing, first, the determination of the presence or absence of interference is made by adding the shape to the movement path of the control point by using the method described earlier. As a result of the determination of the presence or absence of interference, if the movement regions overlap one another, interference occurs depending on the movement speed of each control point.

Figure 5:
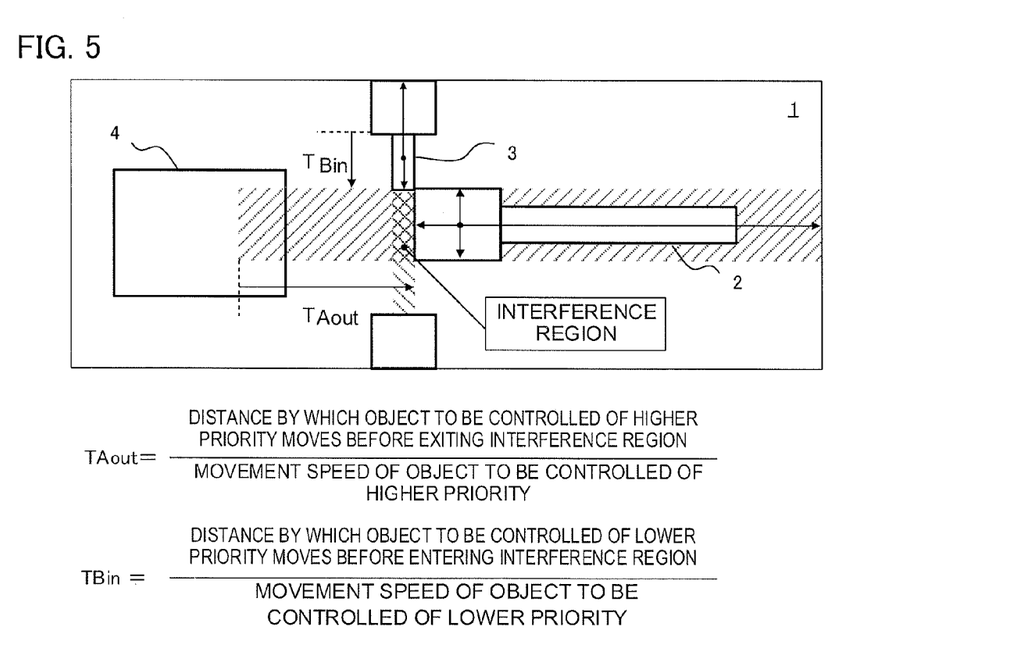
FIG. 5 is a diagram explaining a method for calculating operation start timing of an object to be controlled of lower priority in the present invention.

Next, the time ($T_{Aout}$) that elapses before the object to be controlled of higher priority exits the interference region and the time ($T_{Bin}$) that elapses before the object to be controlled of lower priority enters the interference region are calculated by using expressions depicted in FIG. 5, and a comparison between the time ($T_{Aout}$) and the time ($T_{Bin}$) is performed.

Then, if $T_{Aout} \leq T_{Bin}$, even when the two control points start to operate at the same time, since the object to be controlled of lower priority reaches the interference region after the object to be controlled of higher priority passes the interference region, interference does not occur. In this case, in the program O0002, the retracting operation of the loader axis and the closing operation of the door are started at the same time, and, when the operation of the object to be controlled (the door) of lower priority is completed in N20, N30 which is a next block is started even when the object to be controlled (the loader) of higher priority is still operating. Moreover, in the program O0003, the N10 block and the N20 block start execution in succession. When the operation of the object to be controlled (the door) of lower priority is completed in N20, N30 which is a next block is started even when the object to be controlled (the loader) of higher priority is still operating.

If $T_{Aout} > T_{Bin}$, when the two control points start to operate at the same time, since the object to be controlled of lower priority reaches the interference region before the object to be controlled of higher priority exits an interference region, the object to be controlled of lower priority and the object to be controlled of higher priority interfere with each other. In this case, in the program O0002, control is performed such that the closing operation of the door is started after a lapse of time $T_{Aout} \cdot T_{Bin}$ after the loader axis starts to retract and, when the closing operation of the door of lower priority is completed, the execution of the N30 block which is a next block is started. Moreover, in the program O0003, the N20 block starts execution after a lapse of time $T_{Aout} \cdot T_{Bin}$ after the start of the N10 block and, when the execution of N20 is completed, N30 is started.

In both the programs O0002 and O0003, since the door enters the interference region the moment when the loader axis exits the interference region, the loader axis and the door do not interfere with each other.

Figure 6A:
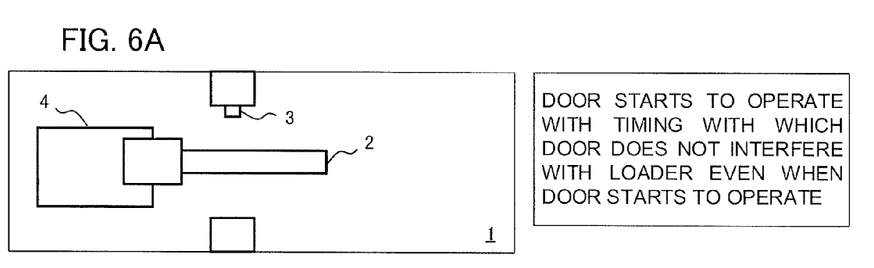
FIGS. 6A, 6B, and 6C are diagrams depicting an operation example of a loader and a door which are controlled by the present invention.
Figure 6B:
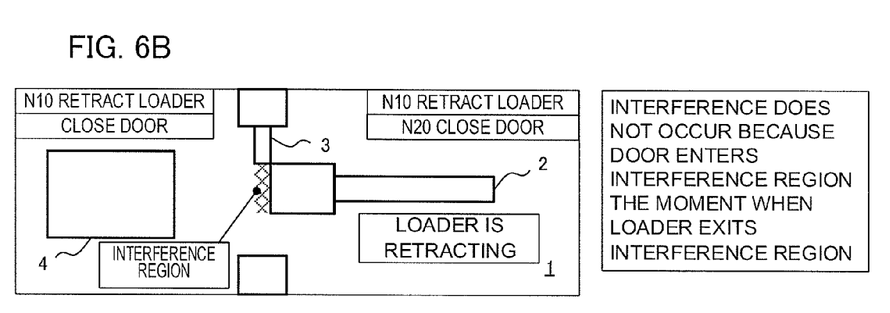
Figure 6C:
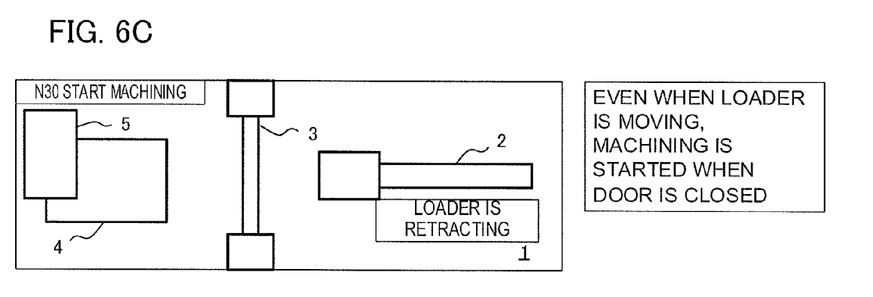

FIGS. 6A to 6C are diagrams depicting the flow of operation control that starts a machining operation by closing the door 3 while retracting the loader 2 by executing the program depicted in FIG. 4 in the numerical controller of this embodiment.

As depicted in the drawings, the loader 2 retracts after finishing the placement of the work 4. In the present invention, unlike the prior art technique, before the loader 2 completely retracts, the door 3 starts to operate with the timing determined by the above-described block execution start determination processing. Since the operation start timing of the door 3 is calculated as timing with which the door 3 and the loader 2 do not interfere with each other, control is performed such that the door 3 enters the interference region the moment when the loader 2 exits the interference region, and the door 3 and the loader 2 do not interfere with each other.

Then, when the door 3 is closed, even when the loader 2 is still moving, the tool 5 starts to machine the work 4. As a result, since the operation start of the loader 2, the operation start of the door 3, and the start of the machining operation are performed with the timing depicted in FIG. 1, it is possible to eliminate useless time and shorten the entire operation time as compared to the prior art technique.

Figure 7:
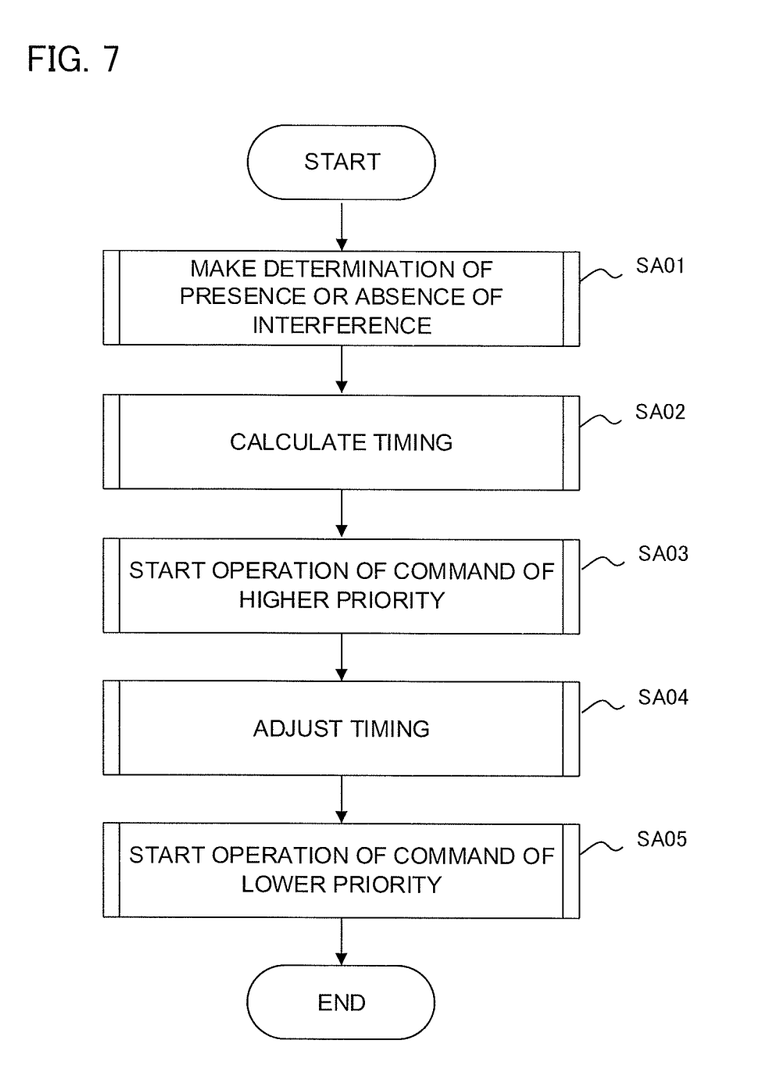
FIG. 7 is a schematic flowchart of block execution start determination processing in the embodiment of the present invention.

FIG. 7 is a schematic flowchart of the block execution start determination processing which is performed by the block execution start determining portion 13 of the numerical controller 10 in this embodiment.

[Step SA01] A movement path obtained by adding the shape to a control point of each object to be controlled is obtained, a determination is made as to whether or not there is a possibility that interference occurs between the objects to be controlled, if there is a possibility that interference occurs, the time $T_{Aout}$ that elapses before an object to be controlled by a command of higher priority exits the interference region and the time $T_{Bin}$ that elapses before an object to be controlled by a command of lower priority enters the interference region are calculated and compared with each other, and a determination is made as to whether or not interference actually occurs.

[Step SA02] If a determination is made in step SA01 that interference occurs, timing with which an operation of the object to be controlled of lower priority is started is calculated based on the time $T_{Aout}$ that elapses before the object to be controlled by the command of higher priority exits the interference region and the time $T_{Bin}$ that elapses before the object to be controlled by the command of lower priority enters the interference region.

[Step SA03] An operation of the command of higher priority is started based on the command data output from the command analyzing portion 12.

[Step SA04] Timing with which an operation of the command of lower priority is started is adjusted based on the timing calculated in step SA02.

[Step SA05] The operation of the command of lower priority is started after the timing adjusted in step SA04 based on the command data output from the command analyzing portion 12.

While the embodiment of the present invention has been described, the present invention is not limited to the example of the embodiment described above and can be implemented in other modes after being appropriately modified.

For example, in the above-described embodiment, the loader and the door are taken as examples of the object to be controlled, but the object to be controlled is not limited to the loader and the door. The present invention can be applied to any objects to be controlled as long as there is a possibility that interference occurs.

Moreover, in the above-described embodiment, an example in which the present invention is applied to the two objects to be controlled has been described, but the present invention can be applied to three or more objects to be controlled. In that case, it is simply necessary to perform the block execution start determination processing on each of the combinations of the objects to be controlled and start an operation of each object to be controlled with timing with which interference does not occur.

Furthermore, in the above-described embodiment, timing with which a command that controls an operation of a machine control axis of lower priority is started is adjusted by the block execution start determination processing which is performed by the block execution start determining portion 13. In addition to this, a unit that designates timing with which a command that controls an operation of the machine control axis of lower priority is started by an input signal which is input from the outside of the numerical controller may be provided. With such a configuration, an operator can start an operation of the machine control axis of lower priority by operating an operating panel or the like earlier than the operation start timing of the machine control axis of lower priority, the operation start timing adjusted by the block execution start determining portion 13, and an operation of the machine control axis of lower priority can be started based on a signal which is generated from a sensor or the like provided in the machine tool or a machining environment or a signal which is generated from a ladder program executed by a PMC or the like, whereby it is possible to perform more flexible operation control in accordance with the circumstances.

The invention claimed is:

1. A numerical controller which controls a plurality of machine control axes based on a machining program, wherein
priorities are assigned to operations of the plurality of machine control axes, and
the numerical controller includes
a command analyzing portion which analyzes the machining program and generates command data which controls the plurality of machine control axes; and
a block execution start determining portion which determines whether interference occurs in the operations of the plurality of machine control axes based on the command data and, if a determination of interference occurring is made, adjusts timing with which a command which controls an operation of a machine control axis of lower priority of the plurality of machine control axes which interfere with each other is started to a time at which the interference does not occur and positioning is completed in a shortest time and the timing according to which the machine control axis with a high priority exits an interference region and the timing according to which the machine control axis with a low priority enters the interference region become the same.

2. The numerical controller according to claim 1, wherein
the block execution start determining portion obtains an interference region which is a region in which interference of the plurality of machine control axes which interfere with each other occurs based on movement paths of the plurality of machine control axes which interfere with each other and adjusts timing with which the command which controls the operation of the machine control axis of lower priority of the plurality of machine control axes that interfere with each other is started based on timing with which a machine control axis of higher priority exits the interference region, the machine control axis of the plurality of machine control axes which interfere with each other, and timing with which the machine control axis of lower priority enters the interference region, the machine control axis of the plurality of machine control axes which interfere with each other.

3. The numerical controller according to claim 2, wherein in adjustment of the timing, calculation is performed with respect to operation times of the plurality of machine control axes.

4. The numerical controller according to claim 3, further comprising:
a unit which designates, by an input signal from an outside of the numerical controller, timing with which a command controlling the operation of the machine control axis of lower priority is started.

5. The numerical controller according to claim 2, wherein in adjustment of the timing, calculation is performed with respect to coordinate values of the plurality of machine control axes.

6. The numerical controller according to claim 5, further comprising:
a unit which designates, by an input signal from an outside of the numerical controller, timing with which a command controlling the operation of the machine control axis of lower priority is started.

7. The numerical controller according to claim 2, further comprising:
a unit which designates, by an input signal from an outside of the numerical controller, timing with which a command controlling the operation of the machine control axis of lower priority is started.

8. The numerical controller according to claim 1, wherein in adjustment of the timing, calculation is performed with respect to operation times of the plurality of machine control axes.

9. The numerical controller according to claim 8, further comprising:
a unit which designates, by an input signal from an outside of the numerical controller, timing with which a command controlling the operation of the machine control axis of lower priority is started.

10. The numerical controller according to claim 1, wherein
in adjustment of the timing, calculation is performed with respect to coordinate values of the plurality of machine control axes.

11. The numerical controller according to claim 10, further comprising:
a unit which designates, by an input signal from an outside of the numerical controller, timing with which a command controlling the operation of the machine control axis of lower priority is started.

12. The numerical controller according to claim 1, further comprising:
a unit which designates, by an input signal from an outside of the numerical controller, timing with which a command controlling the operation of the machine control axis of lower priority is started.

* * * * *